United States Patent
Vierke et al.

(10) Patent No.: US 9,057,225 B2
(45) Date of Patent: Jun. 16, 2015

(54) APPARATUS FOR RELEASABLY HOLDING A PIPE, ROD OR THE LIKE

(71) Applicant: Blohm + Voss Oil Tools GmbH, Hamburg (DE)

(72) Inventors: André Vierke, Hamburg (DE); Frederik Stoldt, Hamburg (DE)

(73) Assignee: Blohm + Voss Oil Tools GmbH, Hamburg (DE)

( * ) Notice: Subject to any disclaimer, the term of this patent is extended or adjusted under 35 U.S.C. 154(b) by 0 days.

(21) Appl. No.: 14/334,993

(22) Filed: Jul. 18, 2014

(65) Prior Publication Data

US 2015/0021946 A1    Jan. 22, 2015

(30) Foreign Application Priority Data

Jul. 18, 2013  (DE) .......................... 10 2013 012 119
Apr. 3, 2014   (DE) .......................... 10 2014 005 234

(51) Int. Cl.
   *B66C 1/42*    (2006.01)
   *E21B 19/07*   (2006.01)
   *F16B 2/14*    (2006.01)
   *E21B 19/10*   (2006.01)

(52) U.S. Cl.
   CPC . *E21B 19/07* (2013.01); *F16B 2/14* (2013.01); *E21B 19/10* (2013.01)

(58) Field of Classification Search
   CPC ..... E21B 19/07; E21B 19/10; E21B 33/0422; F16B 2/14
   USPC ................ 294/102.2, 86.15, 86.26, 192–208; 166/77.51, 85.1, 85.5
   See application file for complete search history.

(56) References Cited

U.S. PATENT DOCUMENTS

| | | | |
|---|---|---|---|
| 2,491,711 A | | 12/1949 | Calhoun |
| 4,381,584 A | * | 5/1983 | Coyle, Sr. .......................... 188/67 |
| 6,536,520 B1 | * | 3/2003 | Snider et al. .................. 166/78.1 |
| 7,992,634 B2 | * | 8/2011 | Angelle et al. ............... 166/85.5 |
| 8,020,627 B2 | * | 9/2011 | Shahin et al. ................. 166/382 |

(Continued)

FOREIGN PATENT DOCUMENTS

DE    102012005794    1/2013

OTHER PUBLICATIONS

German Examiner Swetlana Kaiser, German Office Action in German Patent Application No. 10 2014 005 234.6, mailed Dec. 3, 2014, 5 pp., with partial English translation, 3 pp.

*Primary Examiner* — Saul Rodriguez
*Assistant Examiner* — Gabriela Puig
(74) *Attorney, Agent, or Firm* — W. F. Fasse

(57) ABSTRACT

For holding a pipe, rod or the like, such as a section of a pipe string of an offshore oil drilling rig, an apparatus includes a clamping device insertable into a support body. The clamping device includes a device body with a central opening bounded by an inner circumferential surface that conically tapers at a cone angle. The device further includes clamp elements that are received in the central opening of the device body and that each have a radially outer surface sloping along the cone angle to slide along the inner circumferential surface of the device body, and a radially inner clamping surface to clamp against the coaxially arranged pipe. A holding element respectively connects each clamp element to a linear actuator stroke element that is similarly tilted at the cone angle. The linear actuator may be received in a receiver shaft of the device body.

20 Claims, 10 Drawing Sheets

(56) References Cited

U.S. PATENT DOCUMENTS

| | | | |
|---|---|---|---|
| 8,720,542 B2* | 5/2014 | Hughes et al. | 166/77.51 |
| 2003/0066717 A1* | 4/2003 | Buck | 188/67 |
| 2008/0202813 A1* | 8/2008 | Anthony | 175/52 |
| 2008/0216999 A1* | 9/2008 | Halse | 166/75.14 |
| 2009/0252589 A1* | 10/2009 | Sonneveld et al. | 414/800 |
| 2010/0270033 A1* | 10/2010 | Angelle et al. | 166/380 |
| 2013/0025847 A1 | 1/2013 | Baier et al. | |
| 2013/0153213 A1* | 6/2013 | Angelle et al. | 166/250.01 |

* cited by examiner

APPARATUS FOR RELEASABLY HOLDING A PIPE, ROD OR THE LIKE

PRIORITY CLAIM

This application is based on and claims the priorities under 35 USC 119 of German Patent Application 10 2013 012 119.1 filed on Jul. 18, 2013, and German Patent Application 10 2014 005 234.6 filed on Apr. 3, 2014, the entire disclosures of which are incorporated herein by reference.

FIELD OF THE INVENTION

The invention relates to an apparatus for releasably holding a pipe, a rod or the like. The apparatus comprises a clamping device that includes a device body and a plurality of clamp elements movably arranged in the device body so as to section-wise circumferentially surround and exert a radial inward clamping force component onto the pipe or the like that extends through the apparatus.

BACKGROUND INFORMATION

Apparatuses of the above mentioned type for releasably holding a pipe or the like are known, in which each clamp element has a sloping or inclined surface that cooperates with an opposed sloping or inclined surface, in such a manner so that a vertical or axial actuation motion is transformed into a horizontal or radial motion component of the clamp element, which in turn exerts a radial clamping force component onto the pipe that extends through the apparatus. Such apparatuses or devices are used, for example in the field of offshore oil drilling technology, in order to hold and support pipes such as drill pipes from an offshore oil drilling platform. In this regard, a pipe string is assembled from many individual pipe segments that are coupled with one another at their ends by respective mating threaded or other rotational couplings. Namely, a drilling string or pipe string is assembled by successively lowering a pipe segment, then holding that pipe segment while screwing the next successive pipe segment onto the preceding pipe segment, and then again lowering the growing pipe string in order to thereafter screw on the next pipe segment. This procedure requires an apparatus for holding each pipe segment while the next pipe segment is screwed on, and then releasing the pipe segment in order to allow the pipe string to be lowered.

A representative example of the known prior art is disclosed in the published German Patent Application DE 10 2012 005 794 and the related US Patent Application Publication US 2013/0025847. While the apparatus disclosed therein is useful and effective for its purposes, further developments, alternatives and/or improvements have been made by the inventors in the present application.

SUMMARY OF THE INVENTION

In view of the above, it is an object of an embodiment of the invention to provide at least one alternative to the apparatus described above. It is a further object of an embodiment of the invention to provide an apparatus of the abovementioned general type, with a more effective application of clamping force, so that the apparatus can correspondingly apply a higher clamping force and/or be designed with a lighter weight and/or reduced power input. Another object of an embodiment of the invention is to provide a simpler, more economical and more robust construction of a clamping device for a pipe or the like. Yet another object of an embodiment of the invention is to provide a new manner of supplying or applying the input power to the apparatus. A still further object of an embodiment of the invention is to further reduce or eliminate torsional twisting in the apparatus. One or more of the embodiments of the invention further aim to avoid or overcome any disadvantages in the prior art, and to achieve additional advantages, as apparent from the present specification. The attainment of these objects is, however, not a required limitation of claimed embodiments of the invention.

The above objects have been achieved in one or more of the embodiments of the invention in an apparatus for releasably holding pipes, rods and the like. In the present application, the term "pipe" will be used generally and broadly to refer to any elongated member that is to be releasably held in the apparatus, which may specifically include a pipe, a tube, a solid or hollow rod, a tool shaft or shank, or any other elongated member. The apparatus generally includes a clamping device, and in an installed operating condition further includes or cooperates with an outer support body in which the clamping device is arranged and supported. The clamping device includes a device body that can be inserted and supported in the outer support body. The device body has an annular shape having a central opening with a conically tapering inner circumferential surface that tapers along a cone angle about the axis of the device, with the vertex of this cone angle pointing e.g. downward along the axis in the direction of lowering the pipe. The device further comprises a plurality of generally wedge shaped (or more particularly, annular conical frustum segment shaped) clamp elements that each respectively represent a segment of an annular circular conical frustum. Each clamp element has a radially outer inclined surface that slopes along the cone angle, and a radially inner clamping surface that is configured and arranged to face, engage and section-wise circumferentially partially surround the pipe that is received extending axially through the central opening of the device. When the clamp elements are inserted in the device body, the radially outer inclined surfaces of the clamp elements contact and slide along the conically tapering inner circumferential surface of the device body, so that an axial motion component of the clamp elements relative to the device body necessarily causes a radial motion component of the clamp elements toward or away from the axis.

Further according to the present embodiment of the invention, the device additionally comprises a plurality of linear drive actuators or driven stroke elements. The number of these linear actuators preferably (but not necessarily) corresponds with the number of the clamp elements. Each linear actuator has first and second actuator components that can be driven linearly relative to one another along an actuator axis. The first actuator component is connected to the device body and the second actuator component (or stroke element) is connected to an associated one of the clamp elements so as to be able to drive the connected clamp element relative to the device body. Furthermore, each linear actuator is respectively oriented with its own actuator axis tilted along the above mentioned cone angle relative to the central device axis. Preferably the clamp elements and the linear actuators are distributed uniformly circumferentially around the circumference of the device.

According to another preferred embodiment feature, the device further comprises a respective mounting and guide element (or more generally termed a holding element) connected to and protruding radially outwardly from each respective clamp element. Each holding element is connected to a respective one of the linear actuators and thereby connects the associated clamp element with the respective linear actuator. According to another preferred embodiment feature, each linear actuator is at least partially formed or received in a respective associated receiver shaft in the device body, whereby each receiver shaft further preferably is tilted along the above mentioned cone angle relative to the central device axis. The term "shaft" in this context refers to an elongated hole, opening, passage, recess or the like. The axis of the associated linear actuator is preferably coaxial with the axis of the receiver shaft in which this linear actuator is at least partially received or formed.

The above described arrangement provides a highly precise and highly loadable and robust guidance and actuation of the clamp elements within and relative to the device body. Because the linear actuators are tilted along the cone angle, they can apply an optimal stroke or linear actuation force and a resulting optimal radial clamping or holding force. Namely, the linear actuators apply the actuation force respectively to each clamp element along the direction of the cone angle, and the respective clamp element slides along the conically tapering inner circumferential surface of the device body which is also sloped correspondingly at this cone angle. Thus, the applied actuation force smoothly and optimally drives the sliding motion of the clamp elements along the cone angle. This involves a simultaneous axial motion component and radial motion component, whereby the radial motion component effectuates the clamping force of the clamp elements onto the pipe extending longitudinally through the central opening of the device.

Furthermore, the above arrangement strongly reduces or even prevents a twisting or tilting of the linear actuators. Therefore, the linear actuators can be designed and constructed with a lighter weight and/or to apply a higher clamping force and/or to require a reduced input actuation power.

The linear actuators may comprise any known type, configuration and mechanism for producing a linear drive actuation or stroke motion. For example, the linear actuators may comprise pneumatically or hydraulically driven piston-cylinder arrangements, or a linear electric motor, or an electric, hydraulic or pneumatic rotational motor driving an acme screw shaft and threaded follower, or a rack and pinion, for example. In one example embodiment, each linear actuator comprises a piston-cylinder arrangement that is arranged at least partially in an associated one of the receiver shafts in the device body. The piston-cylinder arrangement includes a piston guided in a cylinder, and a piston rod extending from the piston to form the respective stroke element that is connected to the associated clamp element. Such piston-cylinder arrangements enable the transmission of large forces and are extremely robust. Preferably these piston-cylinder arrangements are driven hydraulically, but alternatively they may be pneumatically driven.

According to another example embodiment, the holding elements connected to and extending radially from the clamp elements are configured as pipe-like or pipe-shaped bodies in that they have a generally annular cylindrical hollow outer wall which extends longitudinally along the cone angle and is arranged to be able to slide over the cylinder of the piston-cylinder arrangement within the respective receiver shaft, while a piston rod section of the respective piston rod of the piston-cylinder arrangement protruding out of the cylinder extends into the hollow inner space of the pipe-shaped body and is there connected to the pipe-shaped holding element. Thereby, the holding elements serve as protective housings for the piston rods. Furthermore, because the holding elements are slidable on the cylinders, therefore the cylinders serve as guides for the holding elements, which in turn serves to stabilize the piston rods especially when they are extended relatively far, for example over 50% of their total extension.

In this manner, the holding elements themselves are guided along their inner circumferential surface on the cylinders in the receiver shafts. In turn, the holding elements then further guide the sliding motion of the clamp elements along the conically tapering inner circumferential surface of the device body along the cone angle.

Furthermore, for guiding the holding elements along their outer circumferential surfaces, the holding elements may at least partially or section-wise extend and slide into the receiver shafts. To enable this, the holding elements are connected to the clamp elements by respective connecting webs, and the receiver shafts each respectively have a longitudinal slit or slot to the inner circumferential surface of the device body, and the respective associated connecting web extends through this longitudinal slot. Each connecting web can be configured as a single continuous web, or as a plurality of individual spaced-apart webs, stems, posts or the like, or be arranged in a lattice or truss configuration, or the like.

In a further alternative embodiment, the holding elements are each respectively configured as a mounting arm or connector bracket that protrudes radially outwardly from the respective associated clamp element. In this embodiment, each such arm-shaped holding element is connected with a free end of a respective piston rod section protruding out of the respective cylinder. In this embodiment, there is no need for the above mentioned connecting webs and the like for establishing the connection between the clamp elements and the holding elements. However, such a simple arm-shaped holding element does not provide as much of its own guide function but instead conveys the guidance of the respective associated linear actuator and/or receiver shaft to the respective associated clamp element.

In order to protect the connection points between the free ends of the piston rods and the arm-shaped holding elements, the device may further comprise cup-shaped protective caps arranged over the free ends of the piston rods.

Furthermore in this alternative embodiment, the device body may have recesses or depressions provided in the end face thereof for receiving the arm-shaped holding elements in these recesses or depressions in the fully retracted state of the linear actuators. This achieves an especially compact configuration and arrangement.

In order to protect against soiling the respective rod section of the piston rod protruding out of the respective cylinder, the piston rod may respectively be surrounded by a pipe-shaped housing that is connected with the piston rod in the area of its free end and is slidable in a telescoping fashion on the respective cylinder. Such a pipe-shaped housing additionally serves to stabilize the piston rod (e.g. support the piston rod against lateral deflection) especially when it is extended relatively far, for example over 50% of its total maximum extension.

In a preferred example embodiment, the device includes a total of exactly four clamp elements. This achieves a respective diametrically opposed clamping force application onto the received pipe. However, a different plural number of clamp elements may be provided, for example in embodiments having from two to ten clamp elements, or preferably three to six clamp elements or most preferably four clamp elements to achieve the optimal combination of uniform clamping, structural simplicity, and economical cost.

According to a further preferred embodiment feature, the device may additionally comprise plate-shaped connector elements extending laterally or circumferentially from the clamp elements in respective opposite mating or interleaving configurations, so that the plate-shaped connector elements of adjacent clamp elements overlap or interleave with one another when the clamp elements are assembled and inserted into the central opening of the device body. Thereby, the clamp elements serve to mutually carry along one another in their sliding motion, to support or ensure a simultaneous inward or outward sliding motion of the clamp elements into or out of the device body. When such plate-shaped engaging connector elements are provided, it is even possible to omit one or more of the linear actuators, i.e. the number of clamp elements may then be greater than the number of linear actuators, because any individual clamp element not directly connected to its own linear actuator will be slidingly moved together with its neighboring clamp element that is positively driven.

To achieve a good balance between the axial motion component and the radially directed clamping motion or force component, it has been found to be advantageous to provide the cone angle of the conical taper of the inner circumferential surface of the device body, as well as the other inclined or tilted components as disclosed herein, at an angle in a range from 10° to 12° relative to the central axis of the device. Thus the vertex angle of the conical taper is preferably in a range from 20° to 24°. More generally, the cone angle may be an acute angle, for example in a range from 5° to 45° or in a preferred range from 8° to 15° or especially from 10° to 12° as mentioned above. A larger angle may provide shorter actuation travel distance and a faster clamping actuation but requires a larger actuation force input, while a smaller angle requires greater actuation travel distance but a lower actuation force input, due to the radial force amplification effect of a steep incline (low cone angle) of the inclined surfaces.

In order to prevent or minimize a twisting of the apparatus during the handling and holding of a pipe section, for example while screwing on a next successive pipe section, the apparatus may further comprise one or more anti-rotation elements protruding radially outwardly from the device body and engaging in a form-locking manner into corresponding rotationally fixed receiver slots or the like in the outer support body. The outer support body is in turn secured to a further structure such as a turntable of an oil drilling platform rig.

BRIEF DESCRIPTION OF THE DRAWINGS

In order that the invention may be clearly understood, it will now be described in further detail in connection with example embodiments thereof, with reference to the accompanying drawings, wherein.

Figure 1:
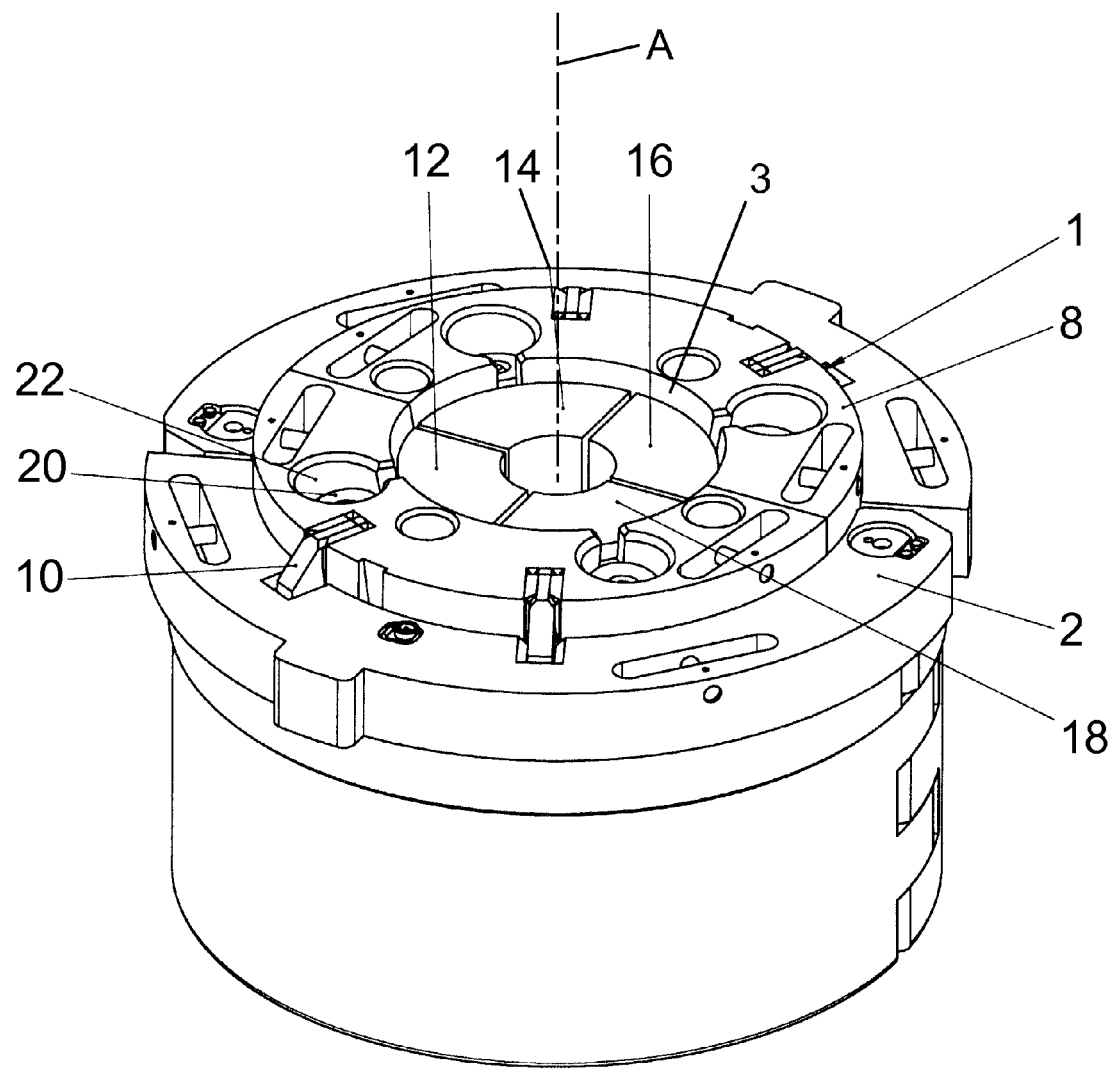
FIG. 1 is a perspective top view of a clamping device according to a first example embodiment of the invention received in an outer supporting body and positioned in its closed clamping state.
Figure 2:
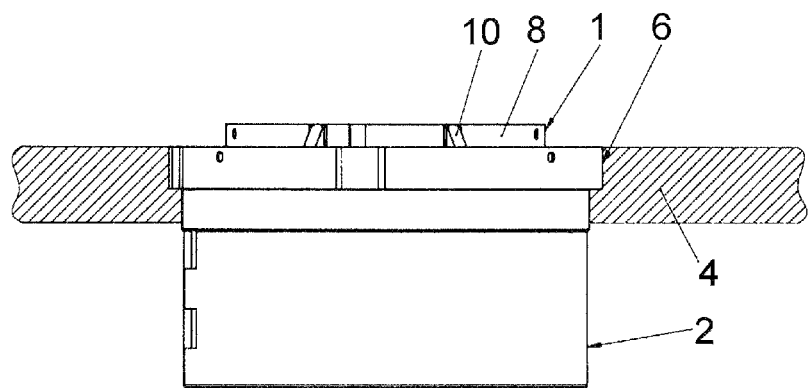
FIG. 2 is a partially sectioned side view of the apparatus according to the first embodiment in an installed condition and the closed clamping state as shown in FIG. 1.
Figure 3:
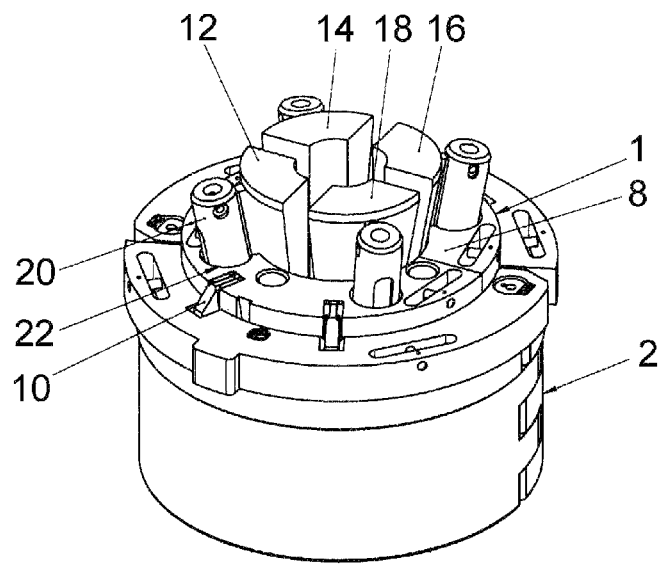
FIG. 3 is a perspective top view of the apparatus according to the first embodiment of FIG. 1, but here shown in its open unclamped state.
Figure 4:
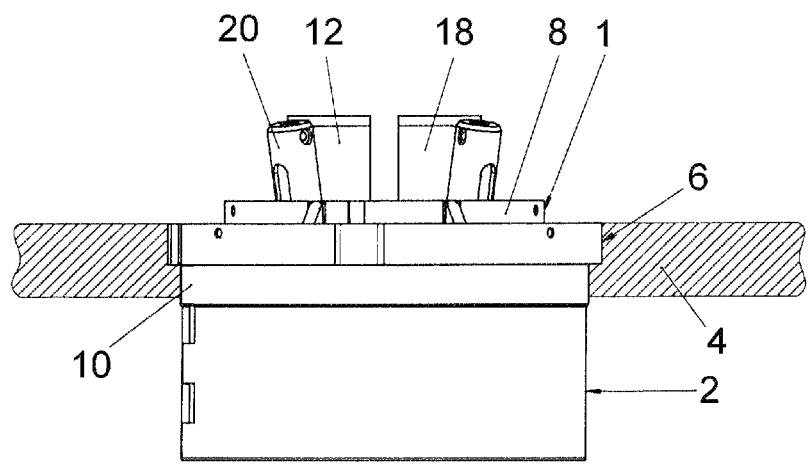
FIG. 4 is a partially sectioned side view similar to FIG. 2, but here showing the open unclamped state of the apparatus according to the first embodiment like in FIG. 3.

DETAILED DESCRIPTION OF PREFERRED EXAMPLE EMBODIMENTS AND THE BEST MODE OF THE INVENTION

FIGS. 1 to 8 show a first example embodiment of an apparatus according to the invention. Most generally, the apparatus comprises a clamping device 1 for holding pipes, rods and the like, for example especially in the field of offshore drilling technology on offshore oil drilling platforms. In this regard, the apparatus further comprises or cooperates with an annular ring-shaped outer support body 2 in which the clamping device 1 is inserted and received. In this example embodiment, the support body 2 is assembled from plural segments or partial circumferential components, but in general the support body may be a single monolithic body or be assembled from any number of components. The support body 2 in turn is further inserted and thus received in an appropriately dimensioned and configured opening of a turntable 4 of the oil drilling platform. In this regard, the support body 2 may have a collar 6 by which the support body 2 is suspended or supported on the turntable 4.

The clamping device 1 comprises a multi-part device body 8 which is received in the outer support body 2, and which is secured against rotation by a plurality of anti-rotation elements 10, for example in the manner of keys or splines received in corresponding keyway slots or grooves on an outer circumferential surface of the device body 8 and an inner circumferential surface of the support body 2.

Furthermore, in the illustrated example embodiment, the clamping device 1 comprises a plurality, here particularly four, generally wedge-shaped clamp elements 12, 14, 16 and 18 that are movably received in a central opening 3 of the device body 8, so as to be slidably movable from a closed clamping position (FIGS. 1 and 2) for holding the pipe, to an open unclamped position (FIGS. 3 and 4) for releasing the pipe, for example to allow the pipe to be removed and a further pipe to be inserted and clamped. While the pipe is not illustrated, it should be understood that the pipe extends longitudinally coaxially along the central axis A of the device. For achieving the closed clamping position, the clamp elements 12, 14, 16 and 18 are slidingly moved in a downward direction relative to the device body 8, and to achieve the open unclamped position the clamp elements are slidingly moved in an upward direction relative to the device body 8. For mounting the clamp elements and guiding the sliding motion of the clamp elements, the device 1 further comprises a respective holding element 20 connected to and protruding radially outwardly from each respective clamp element 12, 14, 16 and 18. In the present example embodiment, the holding elements 20 respectively extend and are movably guided at least partially in respective receiver shafts 22 in the device body 8. For reasons of clarity and simplicity of the illustration, the figures only include reference numbers labeling one of the anti-rotation elements 10, one of the holding elements 20, and one of the receiver shafts 22.

Figure 5:
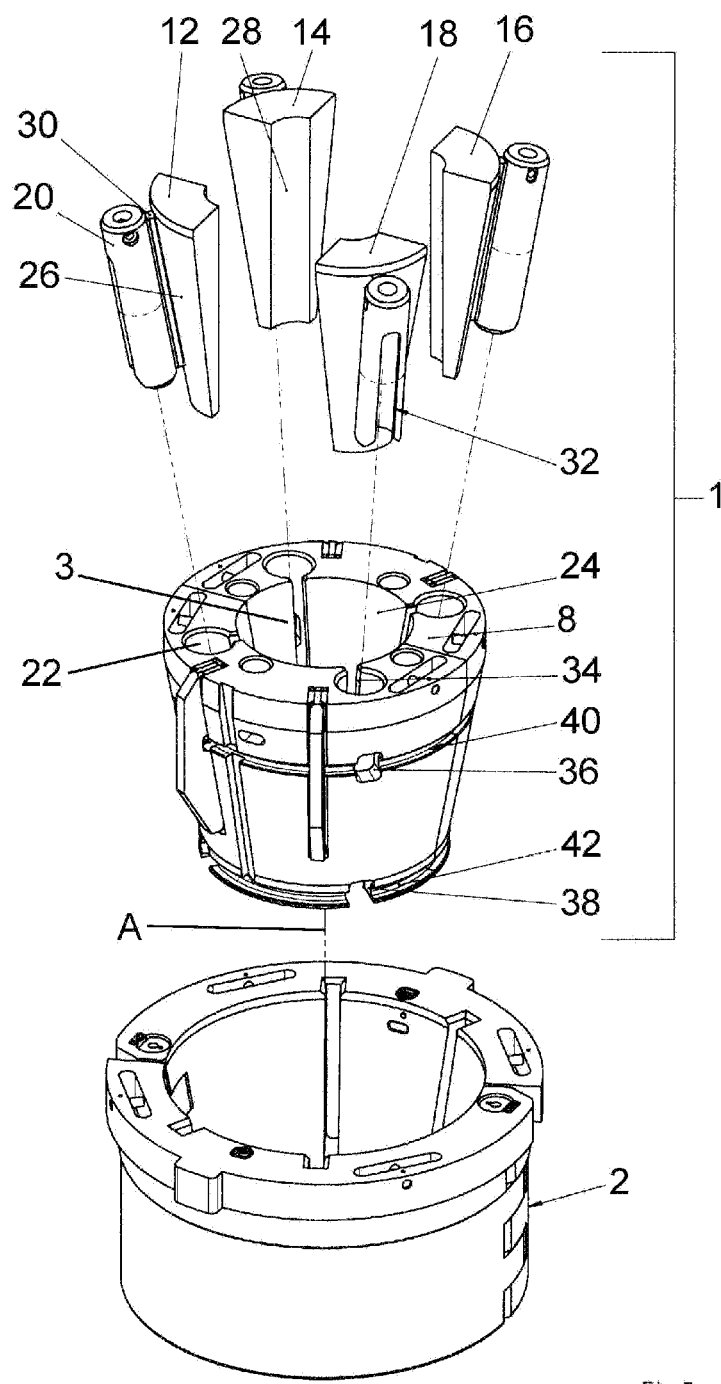
FIG. 5 is an exploded view of components of the apparatus according to the first embodiment.
Figure 6:
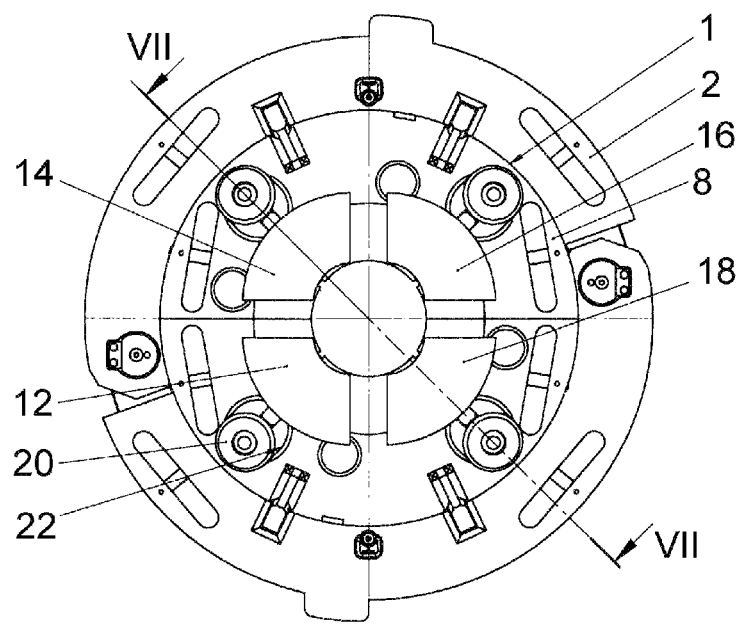
FIG. 6 is a top plan view of the apparatus according to the first embodiment in its open unclamped state.

As shown especially in the exploded view of FIG. 5, the device body 8 generally has the shape of an annular shell or ring or sleeve with a central opening 3 bounded by an inner circumferential wall surface 24 that tapers conically along a cone angle, downwardly in a direction of lowering the pipe that is to be selectively clamped by the device. As a preferred example, the cone angle measures in a range from 10° to 12° relative to the central axis A of the device body, thus the vertex angle of the cone represented by the taper of the inner circumferential surface 24 is preferably from 20° to 24°.

The clamp elements 12, 14, 16 and 18 each respectively have a radially outer surface 26 that is inclined or conically tapered at the same cone angle as the sloping inner circumferential surface 24. Each clamp element 12, 14, 16, 18 further respectively has a radially inner clamping surface 28 that is curved cylindrically and thus forms a section or segment of a cylinder, and is configured and arranged to extend around and clampingly engage a section or portion of the circumference of the pipe that extends coaxially along the axis A of the clamping device. The body of each respective clamp element 12, 14, 16 and 18 between the conically tapering or inclined outer surface 26 and the cylindrical section inner surface 28 forms the generally wedge-shaped configuration of the clamp element as can be seen especially in FIG. 5.

The holding elements 20 are respectively each connected by a respective connecting web 30 onto the radially outer side of the respective clamp elements 12, 14, 16 and 18. In this embodiment, the holding elements 20 are respective pipe-shaped bodies with a closed end (forming a closed top cap in the installed condition as illustrated), and are arranged with an axis of the hollow pipe-shaped body of the element 20 extending at a tilt angle corresponding to the tilt angle of the sloping surfaces 26 and 24, i.e. along the cone angle of the conical taper of the surface 24 relative to the central axis A of the device. On the radially outer side thereof facing away from the respective clamp element 12, 14, 16 or 18, each holding element 20 has a longitudinal opening 32 extending nearly along its entire longitudinal length so as to form an elongated slot communicating into the hollow interior of the respective holding element 20. The purpose thereof will be described further below.

In the present embodiment, the connecting webs 30 have a length corresponding to the length of the holding elements 20, and comprise a continuous solid closed web. However, the connecting webs can instead be embodied with a shorter length, or with several separate web pieces or individual posts or have the configuration of a connecting truss or lattice work, for example. In order that the holding elements 20 can slide into the receiver shafts 22, each receiver shaft 22 has a longitudinal slot 34 extending along the inner circumferential surface 24 so that the respective receiver shaft 22 has open communication into the central opening 3 of the clamping device 1. Thus, the connecting webs 30 of the holding elements 20 extend through and are slidingly guided in the longitudinal slots 34 of the receiver shafts 22. Thus, a width or thickness of the connecting webs 30 is appropriately matched or adapted to the opening width of the longitudinal slots 34.

In this embodiment, the receiver shafts 22 as well as the holding elements 20 each respectively have matched or fitting round cross-sectional shapes so that the holding elements 20 can be fittingly received and slidingly guided in the receiver shafts 22. Furthermore, the receiver shafts 22 are each tilted along the cone angle relative to the central axis A of the clamping device 1. In addition to the above mentioned longitudinal slots 34, the receiver shafts 22 each further have an upper hydraulic opening 36 and a lower hydraulic opening 38, whereby the designations "upper" and "lower" refer to the typical installed condition in which the vertex of the cone angle of the taper points downwardly. The hydraulic openings may alternatively be considered as or represented by a hydraulic passage, channel or line. These hydraulic openings 36 and 38 serve to connect or communicate the receiver shafts 22 radially outwardly with a hydraulic supply (not shown) which supplies pressurized hydraulic fluid in a controlled manner to the upper opening 36 or the lower opening 38 for actuating the linear actuators as will be described below. As an example, the pressurized hydraulic fluid can be supplied through appropriate channels or passages provided in the outer support body 2, to which hydraulic fluid lines connect from a pressurized hydraulic fluid source. To communicate the hydraulic fluid from the channels or passages of the outer support body 2, outer circumferential channels 40 and 42 are provided encircling the outer circumferential surface of the device body 8 and respectively communicate with the upper hydraulic opening 36 and the lower hydraulic opening 38. In the assembled condition of the device body 8 inserted into the outer support body 2, these circumferential channels 40 and 42 are sealed by the inner circumferential surface of the support body but communicate with the fluid passages thereof.

Figure 7:
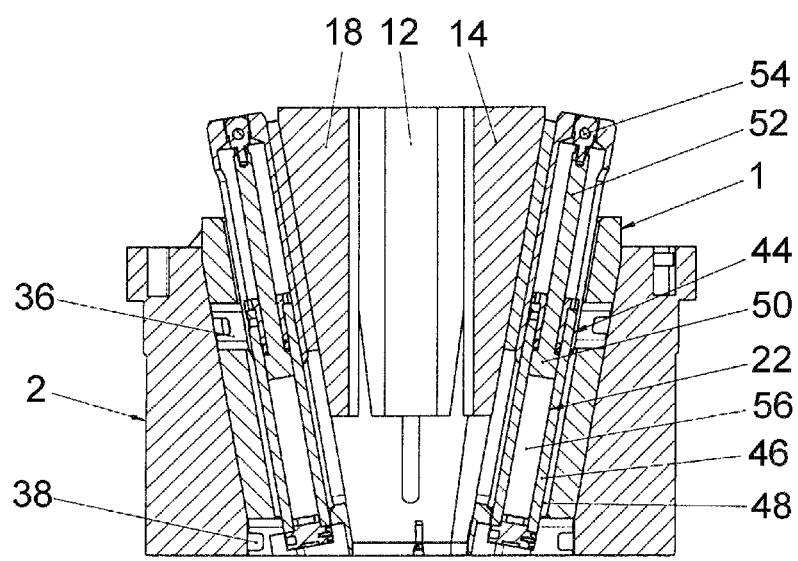
FIG. 7 is an axial sectional view of the apparatus according to the first embodiment in its open unclamped state, along the section plane VII-VII of FIG. 6.
Figure 8:
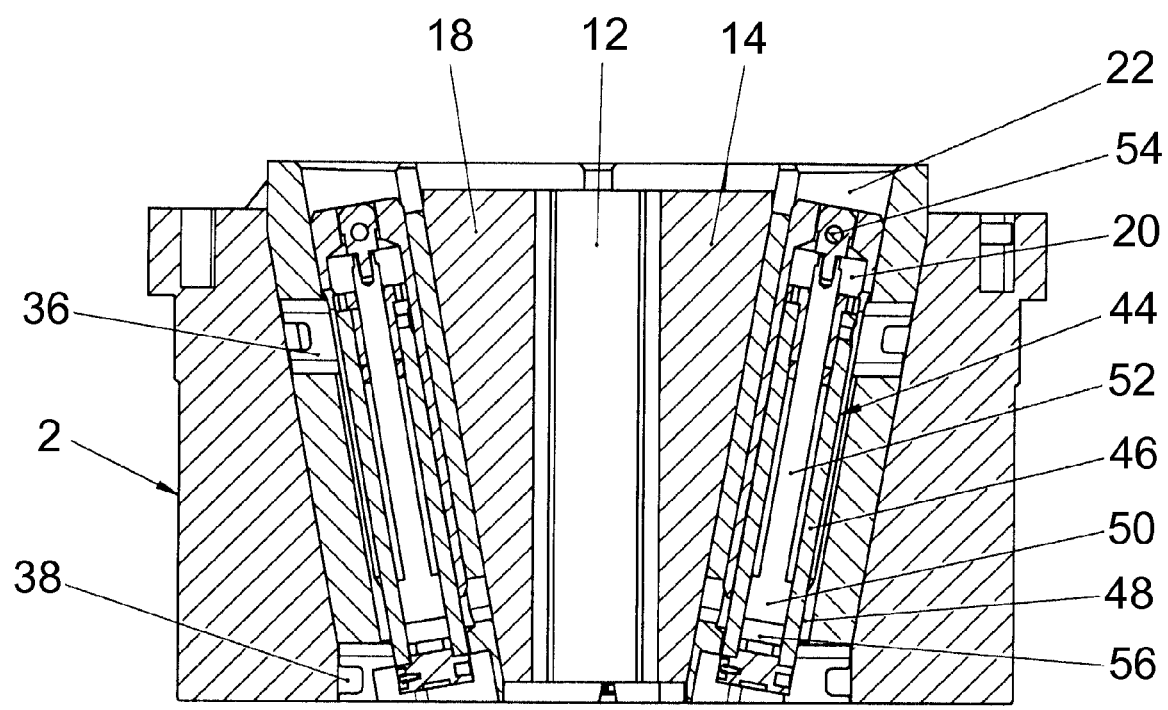
FIG. 8 is an axial sectional view of the apparatus according to the first embodiment similar to FIG. 7, but here showing the apparatus in its closed clamping state.
Figure 9:
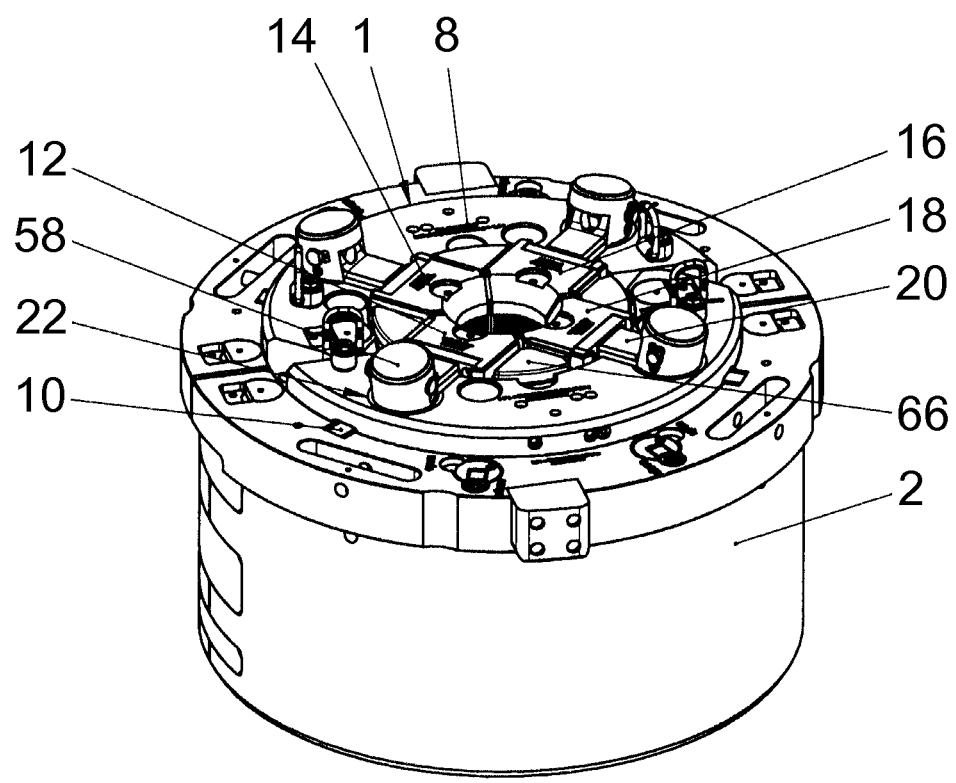
FIG. 9 is a perspective top view of a clamping device according to a second example embodiment of the invention received in an outer supporting body and positioned in its closed clamping state.
Figure 10:
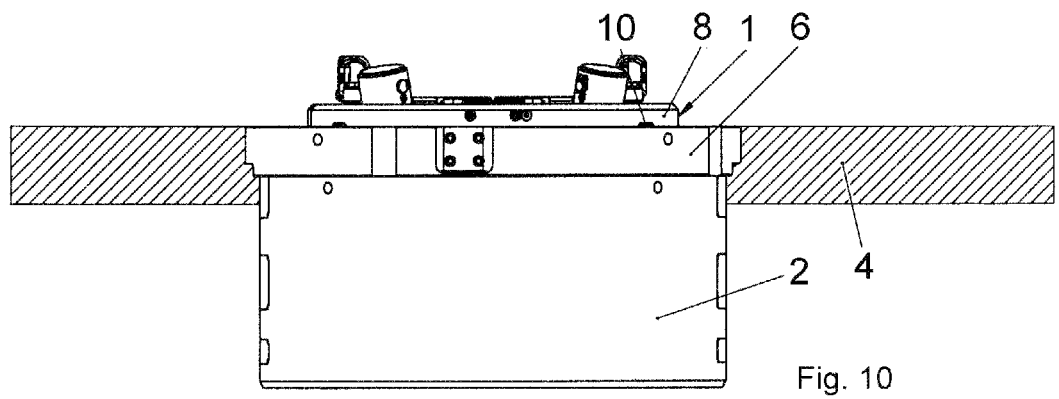
FIG. 10 is a partially sectioned side view of the apparatus according to the second embodiment in an installed condition and the closed clamping state as shown in FIG. 9.

As shown especially in the sectional view of FIG. 7, a respective linear actuator is provided in the form of a piston-cylinder arrangement 44 respectively in each one of the receiver shafts for linearly actuating and thereby slidingly moving the respective clamp elements 12, 14, 16 and 18. Each piston-cylinder arrangement 44 respectively comprises a cylinder of which a bottom end is connected with the respective receiver shaft 22, and is spaced apart from an inner wall of the respective receiver shaft 22 by a radial or annular gap 48 formed therebetween. Each piston-cylinder arrangement 44 respectively further comprises a piston 50 that is slidably arranged in the cylinder 46, and a piston rod 52 extending from the piston 50, which together form a stroke element (or linear actuator element) that is connected with or engages the holding element 20 of the respective associated clamp element. In the present embodiment, the connection between the holding element 20 and a free end of the piston rod 52 is provided by a connecting eye insert 54 that is inserted into the end of the piston rod 52. Further, a crosswise bolt or the like is guided through the eye of the connecting eye insert 54, and a protruding end of the crosswise bolt is received or secured in crosswise bore holes of the holding element 20 (not identified in detail by a reference number). Thus, the respective rod portion of each piston rod 52 protruding out of the respective cylinder 46 extends in the hollow inner space of the associated holding element 20. The piston rods 52 are also oriented respectively coaxially along the shared axes of the respective receiver shafts 22 and the respective holding elements 20. In this arrangement, the holding elements 20 are slidably guided on the cylinders 46, and the annular cylindrical shell wall of each respective holding element 20 is received slidingly in the respective radial annular gap 48. The respective piston 50 bounds a hydraulic working chamber 56 of the respective cylinder 46, and the piston 50 is actuated and driven out when pressurized hydraulic fluid is introduced into the working chamber 56 through the lower hydraulic opening 38 as described above.

In order to drive the clamp elements 12, 14, 16 and 18 upwardly and thus at least partially out of the central opening 3 of the device body 8, thereby also moving the clamp elements radially outwardly apart from one another, in order to switch the clamping device 1 from its closed clamping position (FIGS. 1, 2 and 8) to its open unclamped position (FIGS. 3, 4, 6 and 7) for example, the cylinder working chambers 56 are pressurized with hydraulic fluid, e.g. supplied through the lower circumferential channel 42 and the lower hydraulic opening 38, whereby the pistons 50 and piston rods 52 are driven upwardly (and radially outwardly along the tilt angles established by the cone angle), which in turn drives the clamp elements 12, 14, 16 and 18 upwardly via the holding elements 20. After inserting a pipe, rod or the like that is to be clamped, coaxially into the open space radially inwardly between the clamp elements 12, 14, 16 and 18, then the cylinder working chambers 56 of the cylinders 46 are pressure-relieved, e.g. by allowing the hydraulic fluid to flow out through the hydraulic opening 38 and the circumferential channel 42, whereupon the clamp elements 12, 14, 16 and 18 move downwardly into the closed clamping position. This downward clamping motion of the clamp elements is supported by gravity and the weight of the clamp elements and/or the pipe pushing against the clamp elements, and/or may additionally be spring-biased by clamping return springs (not shown) which pull the clamp elements downwardly relative to the device body. As a further alternative, the downward clamping motion of the clamp elements can be positively driven by supplying pressurized hydraulic fluid to an upper working chamber (not numbered) on the top side of the piston 50 in an annular space within the cylinder 46 around the piston rod 52. This upper working chamber may be pressurized with hydraulic fluid supplied through the upper circumferential channel 40 and the upper hydraulic opening 36, whereby the longitudinal opening 32 in each holding element 20 may participate in allowing the supply of pressurized hydraulic fluid into the interior of the holding element and particularly into the upper working chamber therein. Simultaneously, the now de-pressurized hydraulic fluid in the lower working chamber 56 is driven out as the piston moves downwardly. The channels and openings for the hydraulic fluid supply and return can be reversed or differently configured. It is merely necessary at a minimum to supply and return or drain hydraulic fluid from the main working chamber 56 of each piston-cylinder arrangement.

As the clamp elements 12, 14, 16 and 18 move downwardly, they simultaneously also move radially inwardly toward one another along the conical slope established by the cone angle as described above. This motion continues until the clamp elements engage tightly against the received pipe and then securely clamp and hold the pipe between the clamp elements 12, 14, 16 and 18. The retraction depth or downward travel depth of the clamp elements 12, 14, 16 and 18 thereby depends on or is determined by the respective outer diameter of the pipe that is received and clamped between the clamp elements. Preferably, this retraction depth is always the same, i.e. for working with pipes of the same diameter. Also, it is possible to exchange the clamp elements (or replaceable grip pads thereof) with ones of a different size for clamping different diameters of pipes, so that the retraction depth of the clamp elements in the fully engaged clamping position is preferably always the same even for different diameters of pipe.

FIGS. 9 to 17 show a second example embodiment of an inventive apparatus including a second embodiment of a clamping device 1 for holding pipes, rods or the like, especially in the technical field of offshore drilling from offshore oil drilling platforms for example. The apparatus according to this embodiment of the invention similarly comprises a device 1, which may further be combined with an outer support body 2 in which the device 1 is supported. The device 1 comprises a device body 8 that is insertable into the support body 2 and that has a central opening bounded by an inner circumferential wall surface 24 that conically tapers according to a cone angle in a downward direction in the typical installed position or orientation of the device. The clamping device 1 according to the second embodiment similarly comprises a plurality of generally wedge-shaped clamp elements 12, 14, 16 and 18, which respectively each have an inclined or conically sloping radially outer surface 26 and a radially inner clamping surface 28 for section-wise partially circumferentially extending around and engaging the pipe that is to be clamped. Also similar to the first embodiment, in this second embodiment at least one holding element 20 is respectively provided extending radially outwardly from each one of the clamp elements 12, 14, 16 and 18, and a stroke element or linear actuator that is tilted and linearly movable along the cone angle is respectively connected or engaged onto the respective holding element 20. In a further alternative, more than one stroke element is provided for each clamp element, or as mentioned above each clamp element does not require its own stroke element. The linear actuators or stroke elements are respectively arranged at least partially within respective receiver shafts 22 of the device body 8. Also in this embodiment, each linear actuator comprises a piston-cylinder arrangement 44 inserted or installed in a respective receiver shaft 22, and having a piston 50 with a piston rod 52 forming the respective stroke element (for example see FIG. 15).

The same reference numbers are used for the same or similar components in the first embodiment and the second embodiment, and a redundant description and discussion thereof will be avoided. The following text describes the significant differences between the first embodiment of FIGS. 1 to 8 and the second embodiment of FIGS. 9 to 17 now under consideration.

Figure 11:
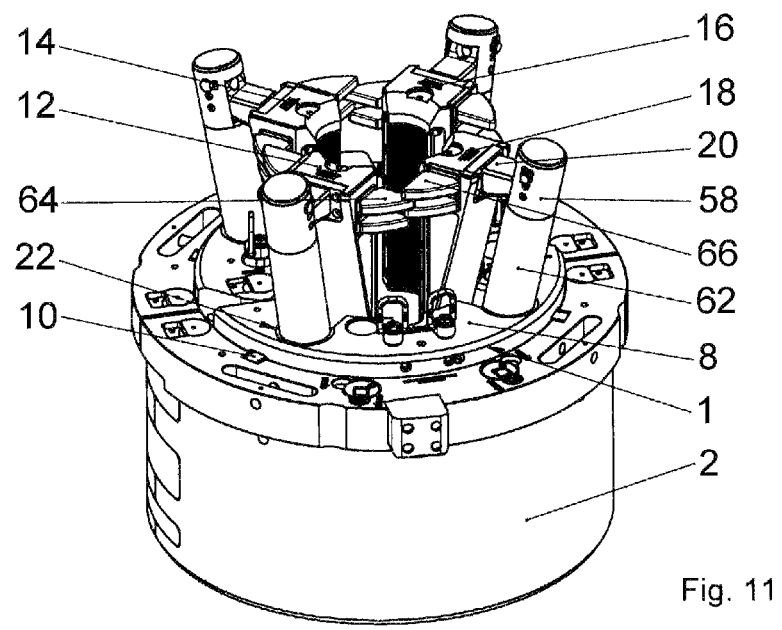
FIG. 11 is a perspective top view of the apparatus according to the second embodiment of FIG. 9, but here shown in its open unclamped state.
Figure 12:
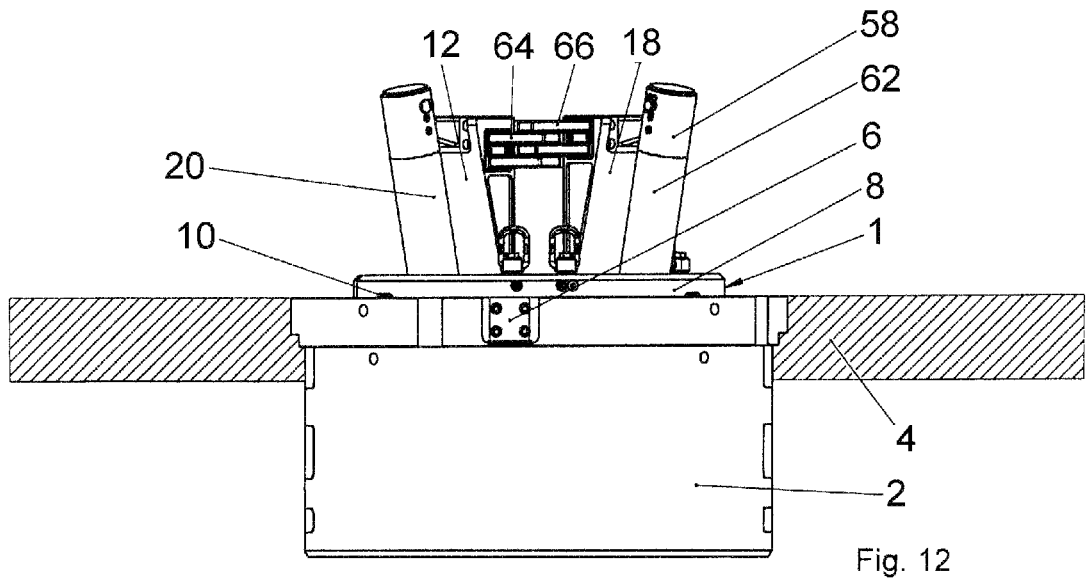
FIG. 12 is a partially sectioned side view similar to FIG. 10, but here showing the open unclamped state of the apparatus according to the second embodiment like in FIG. 11.
Figure 13:
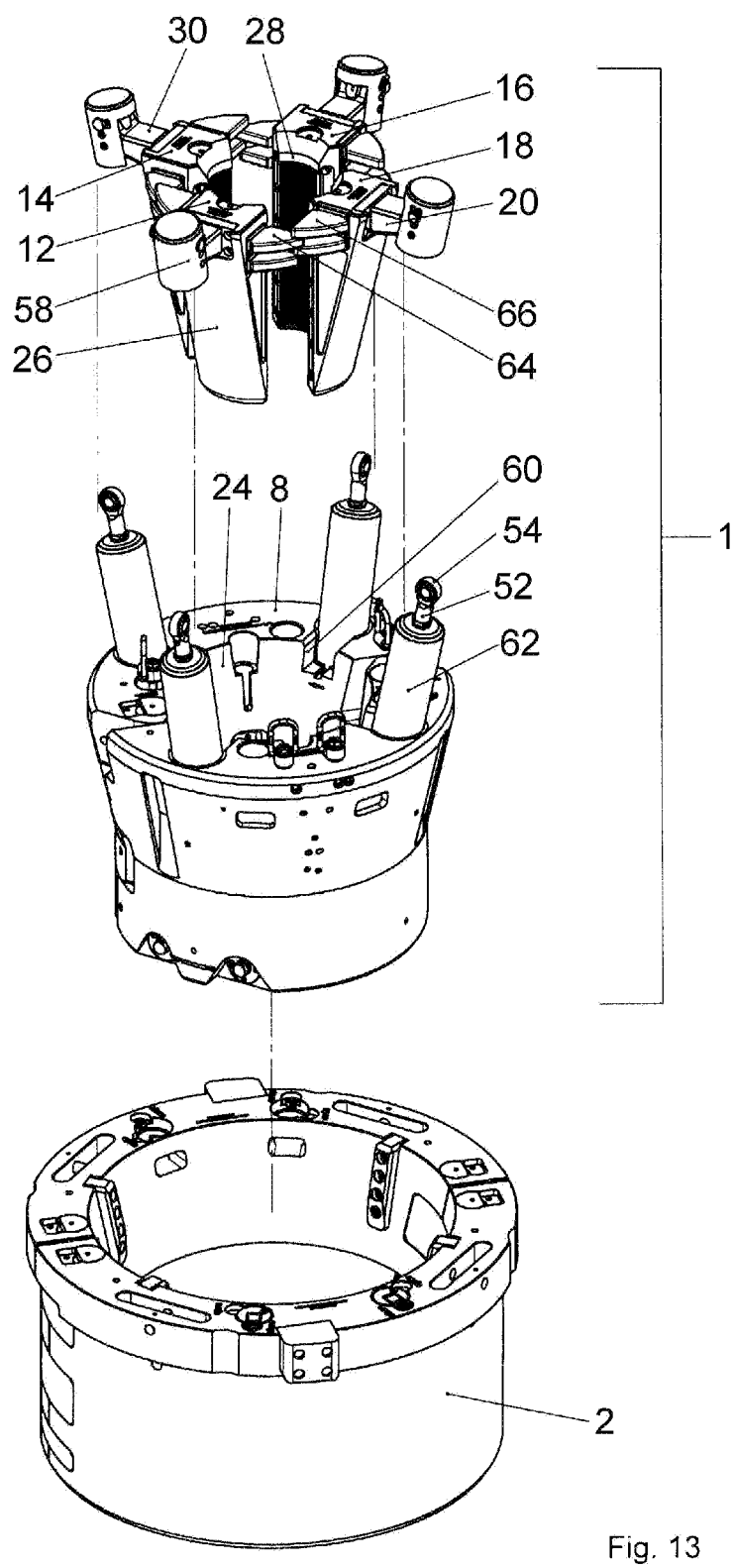
FIG. 13 is an exploded view of components of the apparatus according to the second embodiment.
Figure 14:
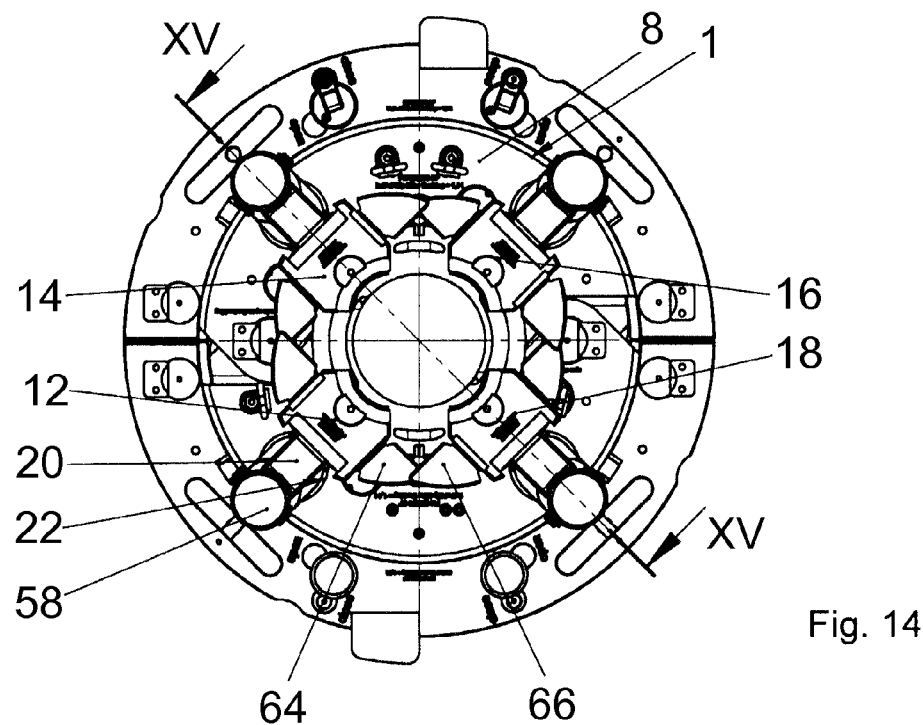
FIG. 14 is a top plan view of the apparatus according to the second embodiment in its open unclamped state.

Rather than being pipe-shaped bodies as in the first embodiment, the radially outwardly extending holding elements 20 of the clamp elements 12, 14, 16 and 18 in this second embodiment are more simply arm-like brackets or protruding arms as can be seen in FIG. 11 for example. As further shown in FIGS. 13 and 15, the holding elements 20 in the form of radially protruding arm-like brackets are each respectively connected with a free upper end of a rod section of a piston rod 52 respectively protruding upwardly out of the respective associated cylinder 46, for example via a respective connecting eye insert 54. Thus, with such a bracket construction of the holding elements, the second embodiment has no separate connecting webs 30 as in the first embodiment. For protecting the free ends of the piston rods 52 or protecting the connecting points of the holding elements 20 with the piston rods 52, the arrangement of the second embodiment may additionally comprise cup-shaped protective caps 58 arranged over the upper free ends of the piston rods 52. In other words the piston rod ends are arranged in the inner space of the protective caps 58 respectively.

The bracket-like holding elements 20 only extend in the upper region of the clamp elements 12, 14, 16 and 18, i.e. they do not extend longitudinally along the clamp elements, so that the above mentioned longitudinal slots 34 of the receiver shafts 22 in the first embodiment are unnecessary and can be omitted in this second embodiment. Instead, the device body 8 has recesses or depressions 60 in the upper end face thereof, into which the holding elements 20 are at least partially received in the retracted or closed clamping position of the clamp elements 12, 14, 16 and 18 (see FIGS. 9 and 13). As can be seen especially in FIG. 13, each such recess or depression 60 can, however, be considered as a relatively wide and short or shallow longitudinal slot at the upper portion of the respective receiver shaft. Furthermore, another embodiment (not shown) may have both the longitudinal slots 34 and the recesses 60 in combination, to receive a connecting web as well as an upper portion of a holding element.

In order to protect the piston rods 52 and/or laterally stabilize the piston rods in the far-extended condition thereof, the clamping device 1 according to the second embodiment further comprises a respective pipe-shaped housing 62 for each piston-cylinder arrangement 44, for example as shown in FIGS. 11, 12, 13, 15 and 17. This housing 62 is respectively rigidly connected at the area of the free end of a respective associated piston rod 52. The housing 62 has such a length or extension so as to surround a rod section of the respective piston rod 52 protruding out of the respective cylinder 46, and additionally to extend over and slide on the respective cylinder 46 (see FIG. 17). In that regard, the housing 62 always extends into an annular space 48 between the respective cylinder 46 and the inner circumferential wall of the respective receiver shaft 22. The housing 62 further adjoins the respective protective cap 58 in a gap-free or nearly gap-free manner and preferably has the same outer diameter as the protective cap 58.

Additionally, in comparison to the first embodiment described above, the clamp elements 12, 14, 16 and 18 in this second embodiment are further provided with laterally or circumferentially extending plate-shaped connector elements 64 and 66 on both edges thereof facing in the circumferential direction. They are configured and arranged to form overlapping or interleaving connections of the plate elements 64 and 66 between adjacent clamp elements in the installed condition, wherein the plate elements extend horizontally (see FIGS. 11, 12, 13 and 14). In this example embodiment, the plate elements 64 and 66 are respectively arranged pair-wise so that an operative drive connection is established between neighboring clamp elements both in the upward extension direction as well as in the downward retraction direction, so that the motion of the respective neighboring clamp elements is mutually supported or interlocked or at least uniformalized. It should be understood that such interleaved plate-shaped connector elements can additionally be provided in the clamping device according to the first embodiment.

Figure 15:
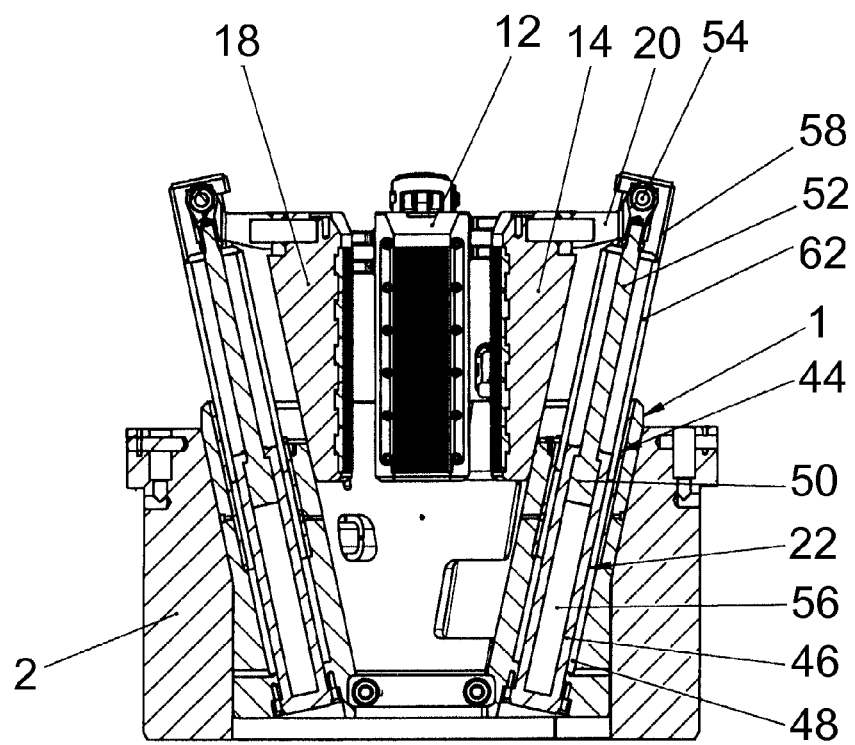
FIG. 15 is an axial sectional view of the apparatus according to the second embodiment in its open unclamped state, along the section plane XV-XV of FIG. 14.
Figure 16:
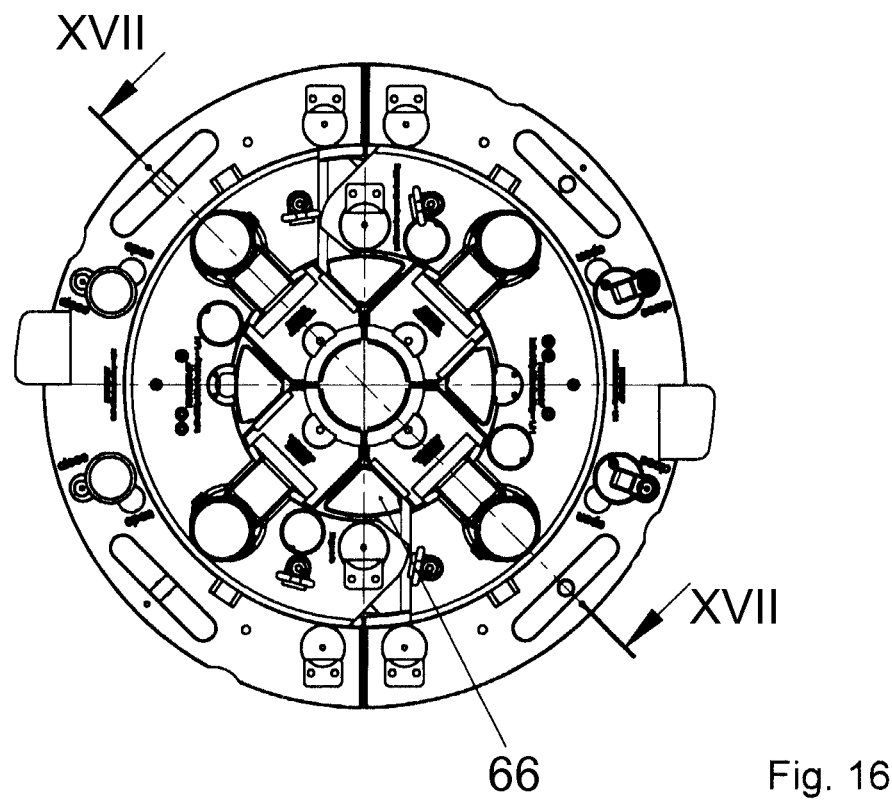
FIG. 16 is a top plan view of the apparatus according to the second embodiment in its closed clamping state.
Figure 17:
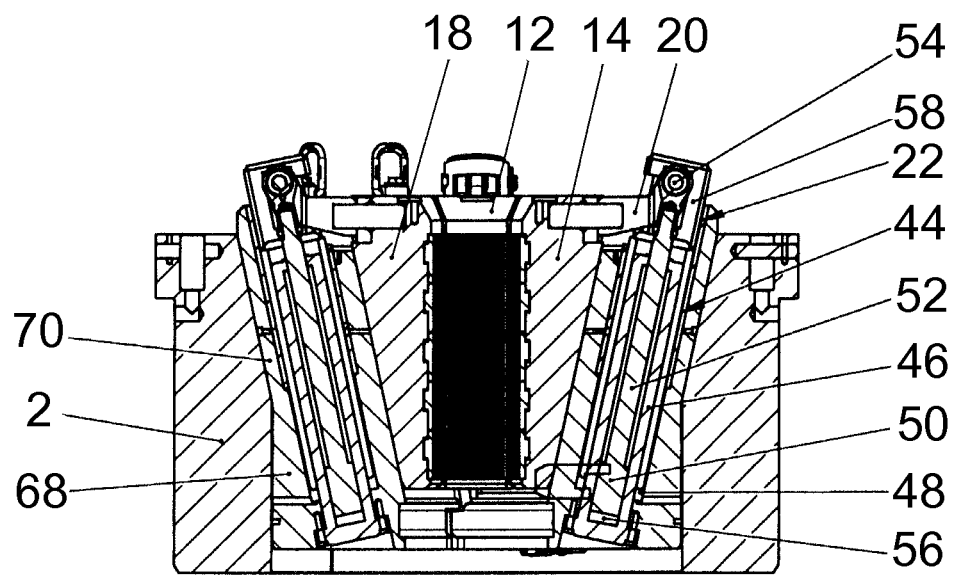
FIG. 17 is an axial sectional view of the apparatus according to the second embodiment similar to FIG. 15, but here showing the apparatus in its closed clamping state.

As shown especially in FIGS. 15 and 17 (in comparison to FIGS. 7 and 8), another difference of the second embodiment compared to the first embodiment involves the outer shape of the base body 8. In the first embodiment, the outer shape of the base body is mostly a truncated conical shape with small cylindrical portions at the upper and lower ends thereof. But in the second embodiment the outer shape of the device body 8 has a much longer cylindrical lower section 68 and a comparatively shorter conical upper section 70 compared to the first embodiment. Of course the internal contour of the support body 2 has a corresponding counter-contour to receive the device body 8 therein.

The functional manner of operation of the apparatus according to the second example embodiment generally corresponds to that of the first example embodiment described above. For extending the clamp elements, i.e. for switching the apparatus from its closed or retracted clamped position to its extended or open unclamped position, the stroke elements are hydraulically activated to be extended by supplying pressurized hydraulic fluid to the working chambers 56 of the piston-cylinder arrangements 44. After inserting a pipe section to be clampingly held, the piston-cylinder arrangements 44 and especially the previously pressurized working chambers 56 thereof are depressurized (e.g. by appropriate operation of supply and return valves of the hydraulic fluid supply arrangement), whereupon the pistons, piston rods and connected clamp elements 12, 14, 16 and 18 move back or retract into their closed clamping position. Thereby the working chambers 56 are minimized in volume, and the clamp elements 12, 14, 16 and 18 simultaneously move axially downward and radially inward toward one another until they contact, sectionally circumferentially surround and tightly clamp the pipe. In comparison to the first example embodiment, in the present second example embodiment the additional lateral plate-shaped connector elements 64 and 66 of neighboring clamp elements 12, 14, 16 and 18 intermesh or engage one another so as to achieve a mutual support and uniformalization and synchronization of the motion of all of the clamp elements together.

In the two example embodiments described above, the linear actuators comprise hydraulically powered piston-cylinder arrangements, but the operation of such piston-cylinder arrangements may instead be driven pneumatically. Namely, the operation of the apparatus is not limited to hydraulic actuation. For a pneumatic actuation, the hydraulic openings 36 and 38 and the circumferential channels 40 and 42 are then pneumatic passages rather then hydraulic passages. As a further alternative, any other type of conventionally known linear actuator can be used instead of a piston-cylinder arrangement.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. An apparatus for holding a pipe, comprising a clamping device that comprises:
    a device body that extends annularly around a central opening along an axis and that has an inner circumferential surface bounding said central opening, wherein said inner circumferential surface tapers conically at a cone angle relative to said axis;
    a plurality of clamp elements that are arranged movably relative to said device body so as to be movable at least partially into and at least partially out of said central opening, wherein each one of said clamp elements respectively has an inclined surface on a radially outer side thereof and a clamping surface on a radially inner side thereof, said inclined surface is inclined at said cone angle relative to said axis and is configured and arranged to slide along said inner circumferential surface, and said clamping surface is configured and arranged to contact and clamp a pipe that is to be held and that extends along said axis; and a plurality of linear actuators, wherein each one of said linear actuators respectively has first and second actuator components that can be driven linearly relative to one another along an actuator axis that is inclined at said cone angle relative to said axis, wherein said first actuator component is connected to said device body, and wherein said second actuator component is connected to a respective one of said clamp elements.

2. The apparatus according to claim 1, wherein said linear actuators are arranged radially outwardly from said clamp elements, said clamping device further comprises plural holding elements that are respectively connected to and extend radially outwardly from said clamp elements, and said second actuator components of said linear actuators are respectively connected to said holding elements which thereby connect said second actuator components to said clamp elements.

3. The apparatus according to claim 2, wherein said device body has plural receiver shafts therein, each one of said receiver shafts is respectively inclined at said cone angle relative to said axis, and said linear actuators are at least partially arranged and received in said receiver shafts with said first actuator components connected to said device body in said receiver shafts.

4. The apparatus according to claim 3, wherein said device body has recesses in an end face thereof and/or longitudinal slots in said inner circumferential surface thereof respectively adjoining and communicating into said receiver shafts, and wherein said holding elements are received at least partially in said recesses and/or said longitudinal slots when said linear actuators are in a retracted position and said clamp elements are in a clamping position.

5. The apparatus according to claim 3, wherein said linear actuators respectively comprise piston-cylinder arrangements that each respectively have said first actuator component comprising an actuator cylinder arranged in a respective one of said receiver shafts, and said second actuator component comprising a piston operatively movably arranged in said actuator cylinder and a piston rod connected to said piston and to a respective one of said clamp elements.

6. The apparatus according to claim 5, wherein said holding elements comprise pipe-shaped bodies that respectively have hollow interior spaces in which at least portions of said piston rods extend, and that are respectively slidably movable onto said actuator cylinders.

7. The apparatus according to claim 6, wherein said holding elements further comprise connecting webs that connect said pipe-shaped bodies to said inclined surfaces of said clamp elements, said device body has longitudinal slots in said inner circumferential surface thereof communicating respectively into said receiver shafts, said pipe-shaped bodies partially extend into said receiver shafts, and said connecting webs extend from said pipe-shaped bodies through said longitudinal slots to said clamp elements.

8. The apparatus according to claim 5, wherein said holding elements comprise radially extending connector brackets that are respectively connected to free ends of protruding rod portions of said piston rods protruding out of said actuator cylinders, whereby said connector brackets respectively connect said piston rods to said clamp elements.

9. The apparatus according to claim 8, wherein said clamping device further comprises cup-shaped protective caps arranged over said free ends of said piston rods.

10. The apparatus according to claim 8, wherein said device body has recesses in an end face thereof respectively adjoining and communicating into said receiver shafts, and said holding elements are received at least partially in said recesses when said linear actuators are in a retracted position and said clamp elements are in a clamping position.

11. The apparatus according to claim 8, wherein said clamping device further comprises pipe-shaped housing members that respectively are connected to said free ends of said piston rods, surround said protruding rod portions, and are slidably movable onto said actuator cylinders.

12. The apparatus according to claim 3, wherein said holding elements are at least partially received and slidably movable in said receiver shafts.

13. The apparatus according to claim 1, wherein said plurality of said clamp elements consists of exactly four of said clamp elements, and said clamping device has only said four clamp elements.

14. The apparatus according to claim 1, wherein said clamping device further comprises plate-shaped connector elements protruding laterally in a circumferential direction from said clamp elements, wherein said plate-shaped connector elements of neighboring ones of said clamp elements are arranged to overlap one another so as to interlink said neighboring ones of said clamp elements with respect to axial motion thereof.

15. The apparatus according to claim 1, wherein said cone angle is in a range from 10 degrees to 12 degrees.

16. The apparatus according to claim 1, further comprising an outer support body that annularly surrounds, receives and supports said device body of said clamping device removably therein.

17. The apparatus according to claim 16, further comprising an anti-rotation element that secures said device body of said clamping device against rotation relative to said outer support body.

18. The apparatus according to claim 16, wherein said linear actuators comprise fluid actuated piston-cylinder arrangements, an outer circumferential surface of said device body of said clamping device has pressurized fluid supply and return channels formed therein, said channels communicate with said piston-cylinder arrangements through radial passages in said device body, and said channels are radially outwardly covered and sealed by an inner circumferential surface of said outer support body.

19. The apparatus according to claim 1, wherein each one of said clamp elements has an annular conical frustum segment wedge shape.

20. An apparatus for holding a pipe, comprising a device body, which is insertable into a support body and which has an inner circumferential surface that tapers about a cone angle in a lowering direction of the pipe, and comprising a plurality of wedge-shaped clamp elements, which each respectively have a rear inclined surface that is inclined at the cone angle and a front clamping surface that is for sectionally surrounding the pipe, characterized in that the clamp elements respectively have at least one holding element on a back side thereof, onto which engages respectively at least one movable stroke element that is inclined at the cone angle and that is arranged in a receiving shaft of the device body.

* * * * *